(12) United States Patent
Sharron et al.

(10) Patent No.: US 10,406,997 B2
(45) Date of Patent: Sep. 10, 2019

(54) RAIL APPLIQUÉ

(71) Applicant: Dura Operating, LLC, Auburn Hills, MI (US)

(72) Inventors: Scott Sharron, Lasalle (CA); Cumhur Unveren, Walled Lake, MI (US); Robert G. Miller, Rochester Hills, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 0 days.

(21) Appl. No.: 15/695,207

(22) Filed: Sep. 5, 2017

(65) Prior Publication Data
US 2019/0071031 A1    Mar. 7, 2019

(51) Int. Cl.
*B60R 9/04* (2006.01)
*B60R 13/04* (2006.01)
*B62D 35/00* (2006.01)

(52) U.S. Cl.
CPC ............... *B60R 13/04* (2013.01); *B60R 9/04* (2013.01); *B62D 35/00* (2013.01)

(58) Field of Classification Search
CPC .................................. B60R 9/04; B60R 13/04
USPC .......................................... 224/309, 325–327
See application file for complete search history.

(56) References Cited

U.S. PATENT DOCUMENTS

| 3,519,180 | A | | 7/1970 | Bott | |
|---|---|---|---|---|---|
| 4,015,760 | A | | 4/1977 | Bott | |
| 4,170,322 | A | * | 10/1979 | Bott | B60Q 1/2661 224/326 |
| 4,901,902 | A | * | 2/1990 | Stapleton | B60R 9/04 224/326 |
| 5,201,487 | A | | 4/1993 | Epplett | |
| 6,114,954 | A | * | 9/2000 | Palett | B60R 9/00 224/321 |
| 2005/0236342 | A1 | * | 10/2005 | Jeong | B60R 9/04 211/20 |
| 2007/0252414 | A1 | * | 11/2007 | Bohm | B60R 9/04 296/210 |
| 2009/0026238 | A1 | * | 1/2009 | Binder | B60R 9/04 224/309 |
| 2013/0299539 | A1 | * | 11/2013 | Bocker | B60R 9/00 224/309 |
| 2014/0353350 | A1 | * | 12/2014 | Sirrenberg | B60R 9/04 224/309 |
| 2015/0137563 | A1 | * | 5/2015 | Eberle | B60R 9/04 296/215 |

(Continued)

FOREIGN PATENT DOCUMENTS

DE    202014102150 U1    7/2014

*Primary Examiner* — Gregory A Blankenship
(74) *Attorney, Agent, or Firm* — Robert E. Ford; Raymond J. Vivacqua; Steven L. Crane

(57) ABSTRACT

A rail system for a motor vehicle includes a structural member disposed on an exterior surface of the motor vehicle. The structural member has an inner surface connected to an upper surface, the upper surface connected to an outer surface, and the inner surface is spaced apart from the outer surface and the outer surface substantially faces away from the motor vehicle. An appliqué is attached to the structural member. The appliqué covers a bottom edge of the structural member and extends along a lower portion of the outer surface of the structural member obscuring a portion of the outer surface of the structural member.

10 Claims, 5 Drawing Sheets

(56) References Cited

U.S. PATENT DOCUMENTS

2016/0297370 A1* 10/2016 Kim .......................... B60R 9/04
2018/0162286 A1*  6/2018 Chen ....................... B60R 9/058
2018/0222396 A1*  8/2018 Binder ..................... B60R 9/04

* cited by examiner

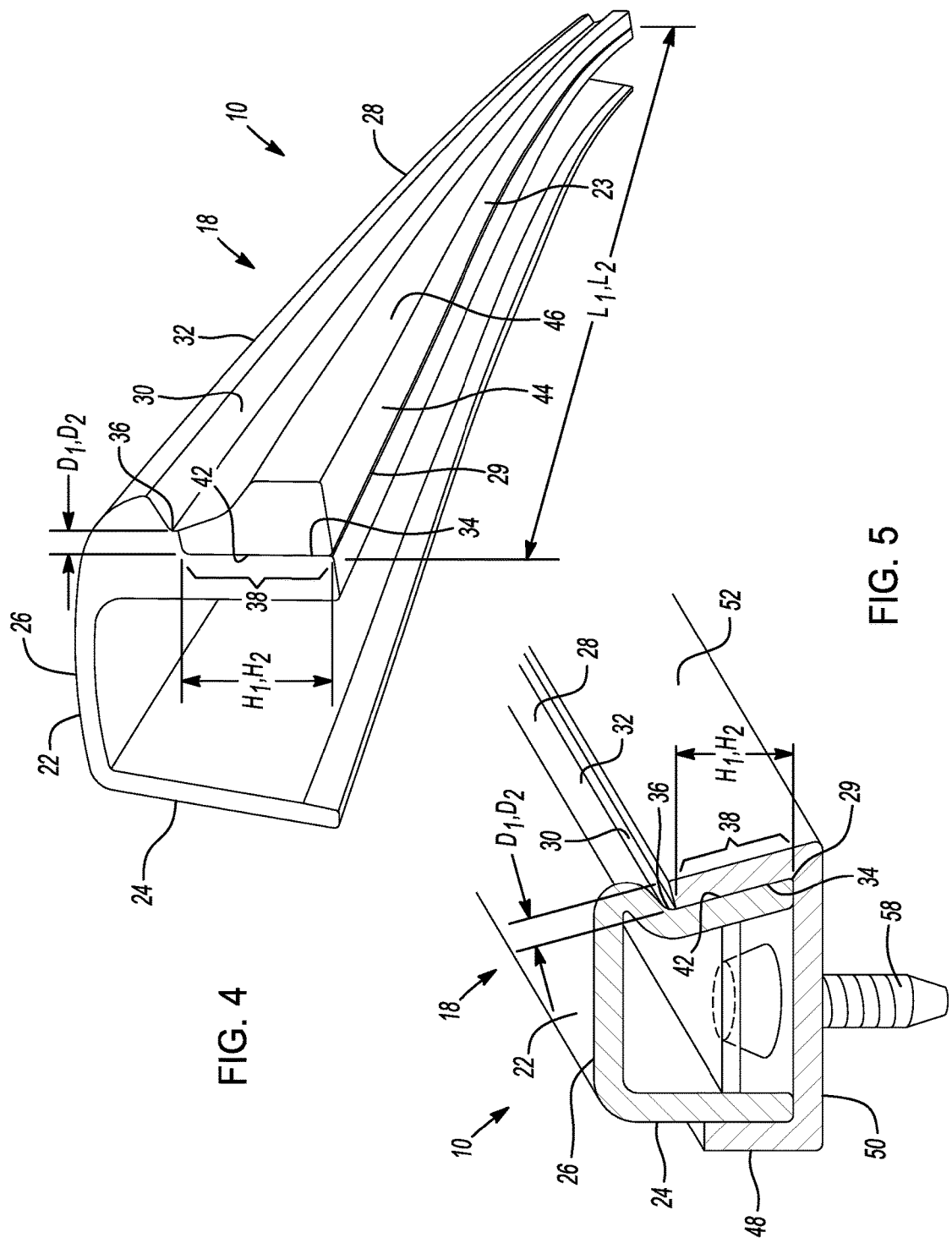

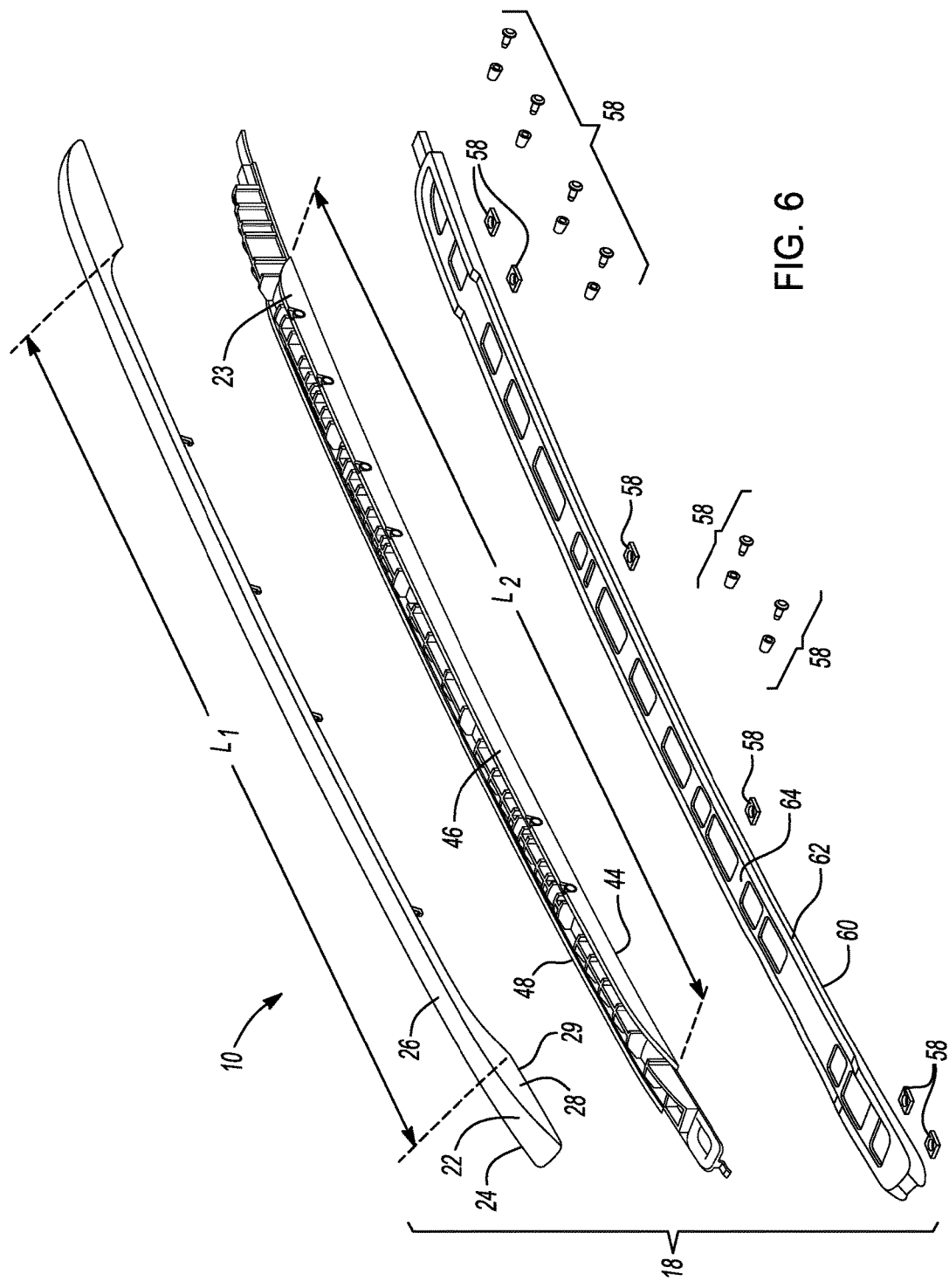

RAIL APPLIQUÉ

FIELD

The present disclosure relates generally to rails mounted on motor vehicles, and more specifically to aesthetic and aerodynamic features of motor vehicle roof rails.

BACKGROUND

The statements in this section merely provide background information related to the present disclosure and may or may not constitute prior art.

Typical roof rail systems for motor vehicles include a stanchion which connects to the vehicle roof and which may space a roof rail or cross bar away from the vehicle roof. In other roof rail systems, the roof rail is connected directly to the vehicle roof. Roof rail systems carry objects such as luggage, materials, recreational equipment or storage on the roof of the motor vehicle, and thus are designed with load carrying ability in mind. Frequently, roof rail systems use specially designed fasteners or conventional load securing devices to attach objects to the roof rails. Because of the structural requirements inherent in the load carrying capabilities of many roof rail systems, the roof rails themselves often extend from the vehicle roof in ways that while functional, are aesthetically disruptive in relation to the shapes of the vehicles to which they are attached. Moreover, because of the structural requirements, typical roof rails are often aerodynamically compromised, and can cause whistling, buffeting or other noises while the vehicle is in motion. Thus, while current roof rail systems achieve their intended purpose, there is a need for a new and improved roof rail design with improved aesthetic and aerodynamic characteristics and performance.

SUMMARY

In one aspect of the present disclosure a rail system for a motor vehicle includes a structural member disposed on an exterior surface of the motor vehicle. The structural member has an inner surface connected to an upper surface, the upper surface connected to an outer surface, and the inner surface spaced apart from the outer surface and the outer surface substantially faces away from the motor vehicle. The rail system further includes an appliqué attached to the structural member, the appliqué covering a bottom edge of the structural member and extending along a lower portion of the outer surface of the structural member. The appliqué obscures a portion of the outer surface of the structural member.

In another aspect of the present disclosure the inner surface is substantially parallel to the outer surface.

In yet another aspect of the present disclosure the appliqué extends from a first end to a second end with a middle section therebetween.

In yet another aspect of the present disclosure the first end is disposed behind a forward end of the structural member of the rail system, and the second end is disposed in front of a rearward end of the structural member of the rail system.

In yet another aspect of the present disclosure the appliqué further comprises a first mating surface attached to the structural member at a plurality of attachment points, a second mating surface conforming to the exterior surface of the motor vehicle, and a decorative surface.

In yet another aspect of the present disclosure the decorative surface forms a decorative outward-facing surface of the rail system. The decorative outward-facing surface is substantially parallel to and facing away from a longitudinal axis of the motor vehicle.

In yet another aspect of the present disclosure the decorative surface of the appliqué comprises a substantially planar curvilinear outer surface that substantially follows the outer surface of the structural member of the rail system.

In yet another aspect of the present disclosure the outer surface of the structural member further includes a first portion not obscured by the appliqué, and a second portion, the second portion defining a recess formed in the outer surface of the structural member, the recess sized to accept the appliqué and having a first depth a first height, and a first length, the appliqué having a second depth between the first mating surface and the decorative surface, a second height, and a second length. The first height is substantially equal to the second height, the first depth is substantially equal to the second depth and the first length is substantially equal to the second length, and the decorative surface of the appliqué is substantially flush with the first portion of the outer surface of the structural member when the appliqué is disposed within the recess.

In yet another aspect of the present disclosure the structural member includes a first material and the appliqué includes a second material different than the first material.

In yet another aspect of the present disclosure the first material includes a metal extrusion, and wherein the second material includes a plastic extrusion.

In yet another aspect of the present disclosure a roof rail system for a motor vehicle includes a structural member disposed in a longitudinal direction on an exterior surface of the motor vehicle, and having a substantially U-shaped cross section. The substantially U-shaped cross section includes an inward-facing wall connected at an angle to an upward-facing wall, and an outward-facing wall connected at an angle to the upward-facing wall, the outward-facing wall being spaced apart from the inward-facing wall, and the outward-facing wall substantially facing away from the motor vehicle. The roof rail system further includes an appliqué fastened to the structural member, the appliqué covering a bottom edge of the structural member and extending along a lower portion of the outward-facing wall of the structural member, and the appliqué obscuring a portion of the outward-facing wall of the structural member.

In yet another aspect of the present disclosure the appliqué further includes a first mating surface, a second mating surface, and a decorative exterior surface. The first mating surface is attached to the structural member at a plurality of attachment points, and the second mating surface conforms to the exterior surface of the motor vehicle.

In yet another aspect of the present disclosure the decorative exterior surface is a substantially smooth curvilinear surface that substantially parallels the outward-facing wall of the structural member, and the decorative exterior surface is substantially parallel to and facing away from a longitudinal axis of the motor vehicle.

In yet another aspect of the present disclosure a recess is formed in the outward-facing wall of the structural member, the recess sized to accept the appliqué and having a first depth, a first height, and a first length, the appliqué having a second depth between the first mating surface and the exterior surface, a second height, and a second length. The first height is substantially equal to the second height, the first depth is substantially equal to the second depth and the first length is substantially equal to the second length, and the decorative exterior surface of the appliqué is substantially flush with the outward-facing wall of the structural member when the appliqué is disposed within the recess.

In yet another aspect of the present disclosure the decorative exterior surface includes a graphic.

In yet another aspect of the present disclosure the plurality of attachment points include at least one of clips, bolts, studs, nuts, screws, interference fittings, tongue-and-groove joints, glue, welds, or rivets.

In yet another aspect of the present disclosure the structural member extends for substantially an entire length of a roof of the motor vehicle, and the appliqué extends from a first end disposed behind a forward end of the structural member to a second end disposed in front of a rearward end of the structural member of the roof rail system with a middle section extending therebetween, and the decorative exterior surface of the appliqué forms a decorative section of at least part of the roof rail system.

In yet another aspect of the present disclosure the structural member further includes a first material and the appliqué includes a second material different than the first material, and the first material includes a metal extrusion.

In yet another aspect of the present disclosure the appliqué has a substantially U-shaped cross section including an inner portion connected at an angle to a downward portion, and an outer portion connected at an angle to the downward portion, the inner portion engages with the inward-facing wall, the outer portion engages with the outward-facing wall, and the downward portion engages with the exterior surface of the motor vehicle, and the appliqué obscures at least a portion of the inward-facing wall and the outward-facing wall of the structural member, the inner portion forms a decorative inner surface of the roof rail system, and the outer portion forms a decorative outer surface of the roof rail system.

In yet another aspect of the present disclosure a roof rail system for a motor vehicle includes a structural rail having a substantially U-shaped cross section with a plurality of first attachment features attaching the structural rail to an exterior surface of the motor vehicle. The substantially U-shaped cross section includes an inward-facing wall connected at an angle to an upward-facing wall; an outward-facing wall connected at an angle to the upward-facing wall, a decorative appliqué having a first attachment surface, a second attachment surface, and a finished surface, the appliqué covering a bottom edge of the structural rail and extending along a lower portion of the outward-facing wall of the structural rail. The appliqué having a first depth between the first attachment surface and the finished surface, a first height, and a first length, the appliqué disposed within a recess formed in the outward-facing wall, the recess having a second depth substantially equal to the first depth, a second height substantially equal to the first height, and a second length substantially equal to the first length, the first attachment surface having a plurality of second attachment features attaching the appliqué to the structural rail, the appliqué obscures a first portion of the outward-facing wall of the structural member, and the finished surface of the appliqué is flush with a second portion of the outward-facing wall. The finished surface of the appliqué forms a decorative exterior aspect of the rail system.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. In the drawings:

FIG. 4 is a perspective cross sectional rear view of a roof rail according to an aspect of the present disclosure;

FIG. 5 is a perspective cross sectional rear view of a roof rail according to another aspect of the present disclosure; and FIG. 6 is an exploded perspective side view of a roof rail according to an aspect of the present disclosure.

DETAILED DESCRIPTION

The following description is merely exemplary in nature and is not intended to limit the present disclosure, application, or uses.

Figure 1:
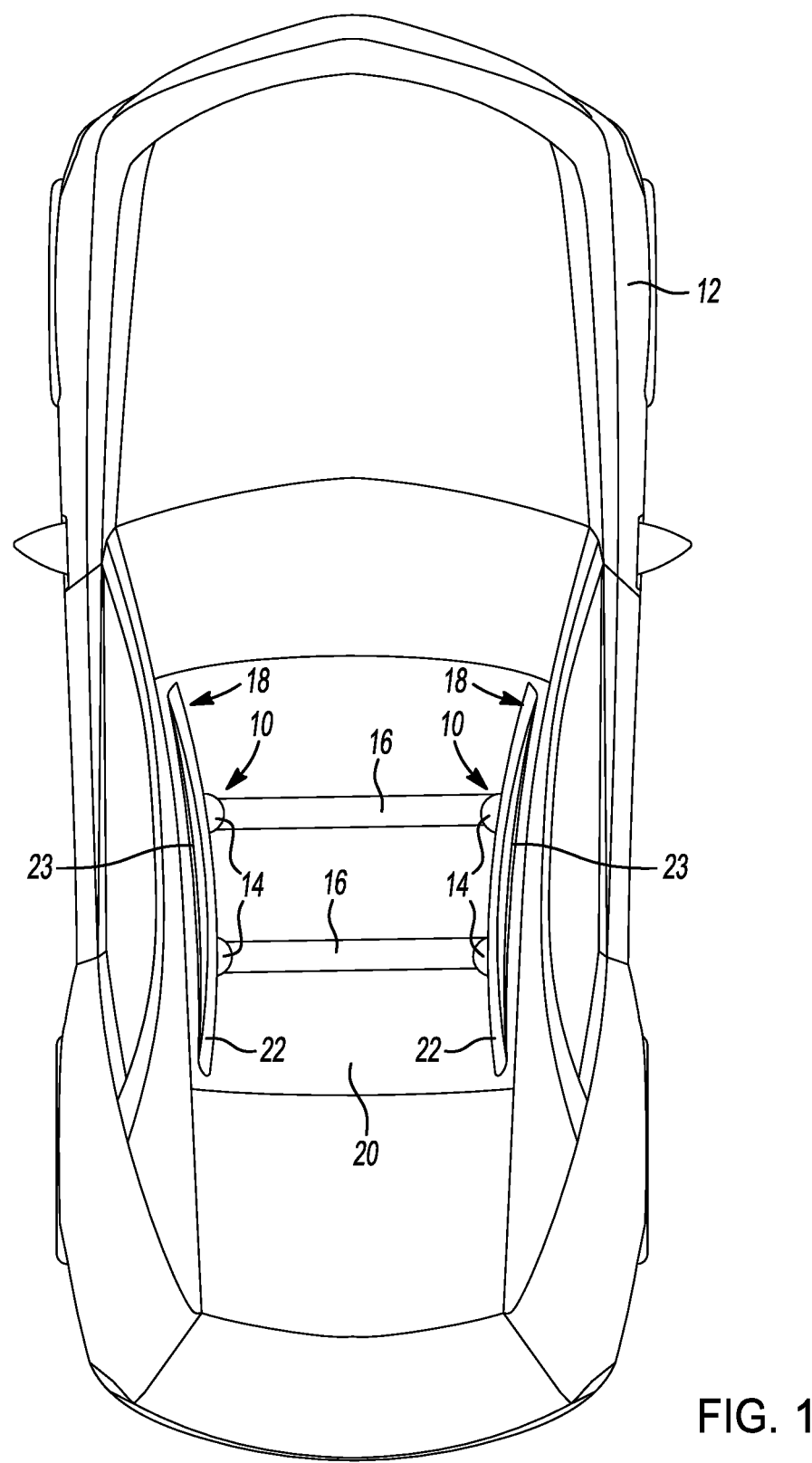
FIG. 1 is an exterior top view of a motor vehicle equipped with a rail system adapted for a roof application on a motor vehicle according to an aspect of the present disclosure.

Referring to FIG. 1, a first example of a rail system according to the present disclosure is shown. While the rail system of the present disclosure may be used in a variety of different positions on a motor vehicle, for ease of understanding, the bulk of the disclosure will focus on roof rail systems for motor vehicles as generally indicated by reference number 10. The rail system 10 is preferably used with a motor vehicle 12, for example a passenger vehicle, truck, sport utility vehicle, van, motor home, or any other type of vehicle without departing from the scope of the present disclosure. The rail system 10 generally includes a plurality of stanchions 14, and a cross bar 16. In some aspects, the stanchions 14 are mounted to a longitudinally oriented roof rail 18.

The roof rail 18 is mounted to the vehicle 12 using attachment points (not shown) provided on the vehicle 12. In one aspect, the roof rail 18 may be mounted to the vehicle 12 by a variety of different attachment mechanisms including: adhesives, welds, mechanical fasteners, such as screws, bolts, clips, rivets and the like. In some aspects, the roof rail 18 may be slidably mounted and in locking engagement with a portion of the roof surface 20 of the vehicle 12. In one aspect, the cross bar 16 is attached to the stanchion 14 by a variety of attachment features (not shown) including: welds, adhesive materials, or mechanical fasteners such as screws, bolts, clips, rivets, and the like. In some aspects, the cross bar 16 may be slidably mounted in a locking interface with the stanchion 14.

Figure 2:
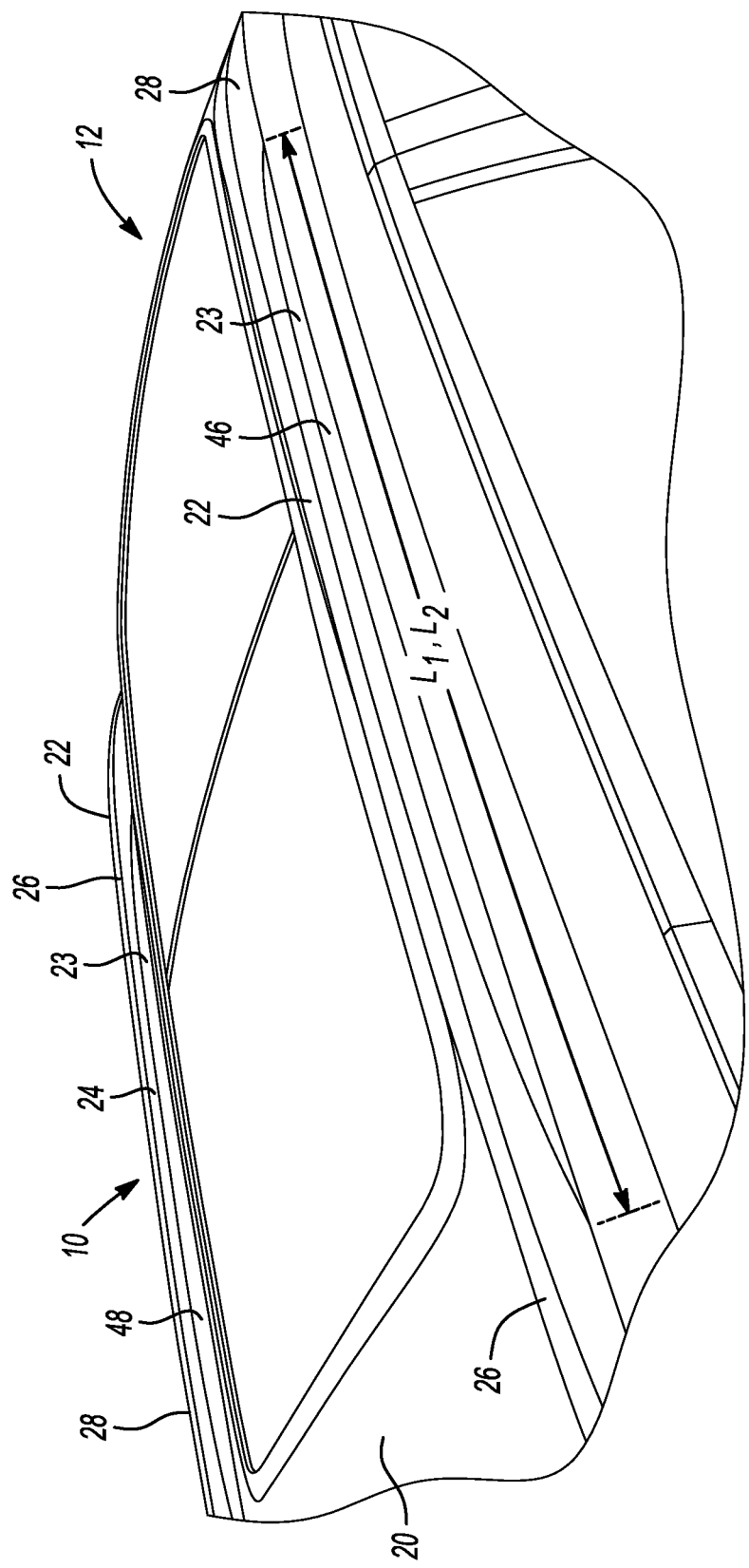
FIG. 2 is a first exterior top rear perspective view of a roof rail system according to an aspect of the present disclosure.
Figure 3:
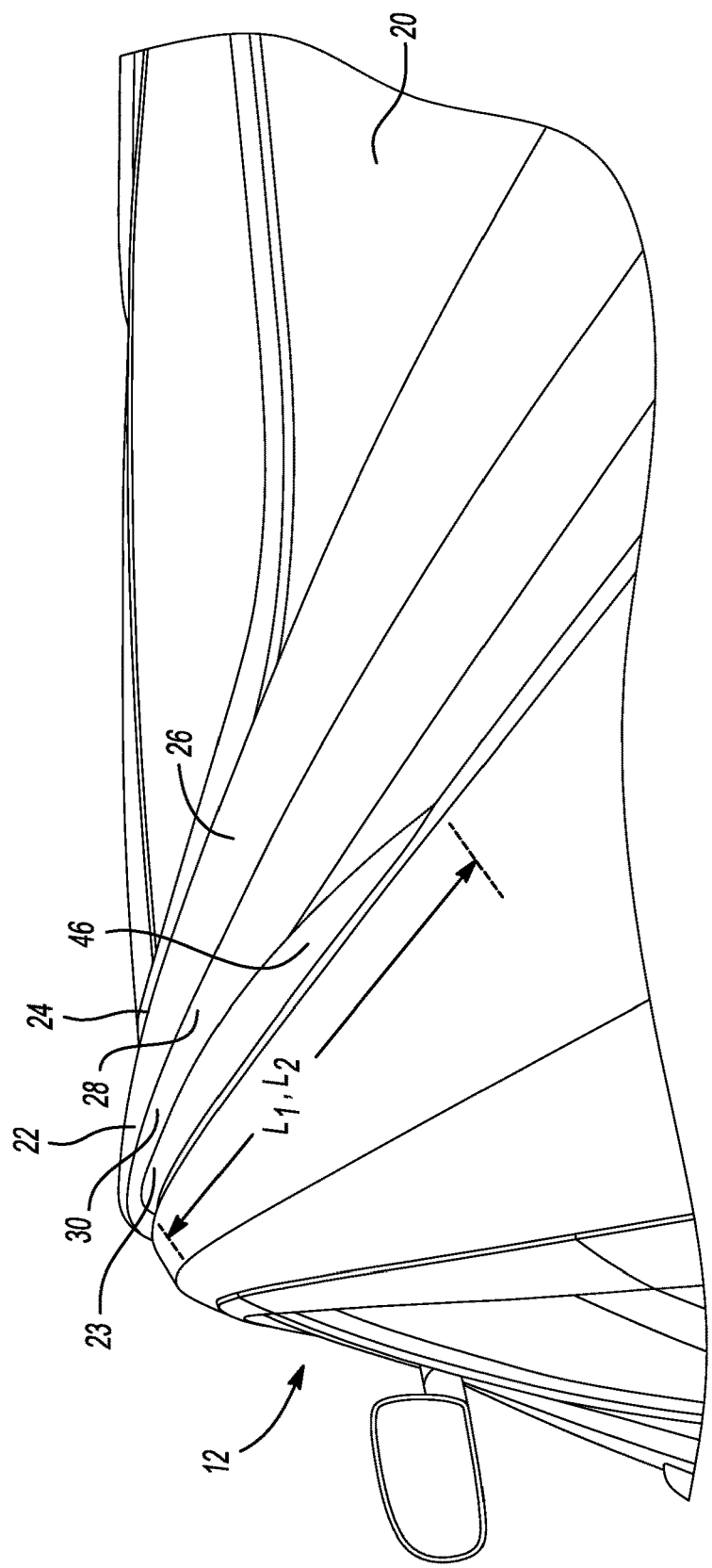
FIG. 3 is a second exterior rear perspective view of a roof rail system according to an aspect of the present disclosure.

Turning now to FIGS. 2-4, and with continuing reference to FIG. 1, the roof rail 18 protrudes from the roof surface 20 of the vehicle 12. The roof rail 18 includes a structural member or portion 22 and an appliqué 23. In some aspects, both the structural member 22 and the appliqué 23 are extruded or molded parts. In other aspects, both the structural member 22 and the appliqué 23 are made of the same material. However, depending on the application it may be desirable for the appliqué 23 to have a finish that contrasts with the finish of the structural member 22. Thus, one or the other, or both of the structural member 22 and the appliqué 23 may be coated, anodized, chromed, etc. to provide the roof rail 18 with contrast in relation to one another, or to the vehicle 12 or to both. In some aspects, the appliqué 23 may be painted to match or contrast with the color of the vehicle 12 to which the roof rail 18 is attached. In several aspects, the structural member 22 and the appliqué 23 are made of differing materials. For example, the structural member 22 may be a metal extrusion or molded part, and the appliqué 23 may be a plastic extrusion or molded part.

The structural member 22 has a substantially U-shaped cross section with an inner surface or wall 24 connected to an upper surface or wall 26, and an outer surface or wall 28 connected to the upper surface or wall 26. In the example of the roof rail 18, the inner surface 24 is spaced apart from the outer surface 28. The inner surface 24 faces substantially toward a longitudinal axis or centerline of the vehicle 12, and the outer surface 28 faces substantially outward and away from the longitudinal axis or centerline of the vehicle 12. In one aspect, the inner surface 24 and the outer surface 28 are spaced apart from one another and run substantially parallel to one another in a longitudinal direction along the roof surface 20 of the vehicle 12. In another aspect, the inner surface 24 and the outer surface 28 may be angled with respect to one another due to aerodynamic, packaging, or structural constraints, or the like. The outer surface 28 extends from the upper surface 26 to a bottom edge 29. The bottom edge 29 has a smooth curvilinear shape that forms a portion of the outer surface 28 which conforms to and faces the roof surface 20 of the vehicle 12. It should be understood that while the structural member 22 has been described as having a substantially U-shaped cross section, the cross-sectional shape of the structural member 22 may vary depending on the application for which the roof rail 18 is intended. For example, instead of having a U-shape, the structural portion may have a cross section that is curved, triangular, quadrilateral, pentagonal, hexagonal, etc. without departing from the scope or intent of the present disclosure.

In some aspects, the structural member 22 is formed with a plurality of lateral and/or longitudinal contours. For example, the outer surface 28 of the structural member 22 of FIGS. 2-5 includes an overhang 30. The overhang 30 is shaped to receive and engage with attachment features (not shown) on the stanchions 14, the cross bars 16, and the like. In a further aspect, the overhang 30 is shaped to engage with load securing devices such as ropes, bungee cords, ratchet straps, and the like (not shown) without the presence or use of stanchions 14 or cross bars 16 at all. In another example, the outer surface 28 of the structural member 22 has a first portion 32 and a second portion 34. The first portion 32 is a substantially smooth, curvilinear, decorative, outward-facing aspect of the roof rail 18. The first portion 32 defines an edge 36 of a recess 38, and the second portion 34 defines an interior aspect of the recess 38.

The appliqué 23 is coupled to the roof rail 18 to more smoothly and completely integrate the roof rail 18 into the shape of the vehicle 12 to which the roof rail 18 is attached. More specifically, the appliqué 23 is coupled to the second portion 34 of the outer surface 28 of the structural member 22. Thus, the appliqué 23 obscures the second portion 34 of the outer surface 28 of the structural member 22. The appliqué 23 is disposed within the recess 38 formed into the outer surface 28 of the structural member 22 below the overhang 30. The appliqué 23 has a first mating surface 42, a second mating surface 44, and a decorative surface 46. The first mating surface 42 is attached to the second portion 34 at a plurality of attachment points (not shown) within the recess 38. The first mating surface 42 of the appliqué 23 may be attached at the plurality of attachment points by any number of different attachment means such as clips, bolts, studs, nuts, screws, interference fittings, tongue-and-groove joints, glue, welds, rivets, or the like (not shown). The recess 38 is optimally shaped to accept the appliqué 23 so that the decorative surface 46 is substantially flush with the outer surface 28 of the structural member 22 and extends from the overhang 30 to the bottom edge 29. More specifically, the recess 38 has a first depth "$D_1$" defined by a horizontal distance between the first portion 32 and the second portion 34 of the outer surface 28. The recess 38 also has a first height "$H_1$", defined by a vertical distance between the bottom edge 29 of the structural member 22 located at the roof surface 20 of the vehicle 12 and the edge 36 of the recess 38. Additionally, the recess 38 has a first length "$L_1$" that will be further described below. The appliqué 23 has a second depth "$D_2$" defined by a distance between the first mating surface 42 and the decorative surface 46. In one aspect, the first depth "$D_1$" and the second depth "$D_2$" are substantially equal to one another. The appliqué 23 has a second height "$H_2$" that is substantially equal to the first height "$H_1$", and a second length "$L_2$" that is substantially equal to the first length "$L_1$". When the first mating surface 42 of the appliqué 23 is attached to the structural member 22, the appliqué 23 is disposed within the recess 38 such that the decorative surface 46 and the first portion 32 of the outer surface 28 forms a substantially smooth, continuous, curvilinear shape. Thus, the decorative surface 46 and the outer surface 28 are flush with one another. Furthermore, when the appliqué 23 is disposed within the recess 38, the second mating surface 44 aligns with, contacts, and substantially follows the roof surface 20 of the vehicle 12.

In some examples, the decorative surface 46 of the appliqué 23 may further include decorative features (not shown). The decorative features may take a variety of different forms. The decorative features may include colored or otherwise contrasting, inlaid, incised, or raised patterns, shapes, words, numbers or the like. In some examples, the decorative surface 46 may include a clear surface layer behind which the decorative features are disposed. In further examples, the decorative features may include electronic features such as light emitting diode (LED) displays, fluorescent lighting, and the like, as well as touch sensitive features.

In several aspects, depending on the application for which the rail system 10 is intended, the shapes and sizes of the appliqué 23, and the structural member 22 may vary. For example, for an application where the rail system 10 is the roof rail 18 for a large sport utility vehicle (SUV), the roof rail 18 may be significantly larger in length, width, and height than a similar roof rail 18 for a small hatchback vehicle. Furthermore, irrespective of the overall size of the vehicle 12, the relative sizes of the structural member 22 and the appliqué 23 may depend on the desired aesthetics for the roof rail 18. In an example in which the vehicle 12 is equipped with a large externally-sliding sunroof, the structural design of the roof rail 18 may require that the roof rail 18 be relatively tall, but that the roof rail 18 also extend for only a small portion of the longitudinal aspect of the roof surface 20 of the vehicle 12. In this example, it may be aesthetically desirable to have the recess 38 for the appliqué 23 that has a first length "$L_1$" that extends for only a small proportion of the overall length of the roof rail 18, but having a first height "$H_1$" that is substantially the entire height below the overhang 30. In another example, the recess 38 may have a first length "$L_1$" that extends for substantially the entire overall length of the roof rail 18 and having a first height "$H_1$" that is only a small proportion of the height of the roof rail 18 below the overhang 30, or any combination or variation in full or in part thereof. Similarly, in a second example, it may be desirable for the structural member 22 of the roof rail 18 to extend for substantially the entirety of the longitudinal aspect of the roof surface 20 of the vehicle 12. In the second example, it may be aesthetically desirable to have the appliqué 23 extend for substantially the entirety of the overall length of the roof rail 18, and substantially the entire height below the overhang 30. More generally, it should be understood that the second height "$H_2$", and second length "$L_2$" of the appliqué 23 may vary according to the application for which the roof rail 18 is intended, and the contours of the surface of the vehicle 12 to which the roof rail 18 is attached.

With reference to FIG. 5, and with continuing reference to FIGS. 1-4, in some aspects the appliqué 23 has a substantially U-shaped cross section. For example, the appliqué 23 includes an inner portion 48 connected at an angle to a downward portion 50, and an outer portion 52 connected at an angle to the downward portion 50. The inner portion 48 engages with the inner surface 24, the outer portion 52 engages with the outer surface 28, and the downward portion 50 engages with the exterior or roof surface 20 of the motor vehicle 12. The appliqué 23 obscures at least a portion of the inner surface 24 and obscures the outer surface 28 from the bottom edge 29 to the overhang 30. The inner portion 48 forms a decorative aspect of the inner surface 24 of the roof rail 18, and the outer portion 52 forms a decorative outer aspect of the roof rail 18. In the example of the substantially U-shaped appliqué 23, the inner surface 24 may include a second recess (not specifically shown) optimally sized and shaped to accept the inner portion 48. Thus, in some aspects, the inner portion 48 has an interior surface 54 that is flush with the inner surface 24.

In another example, the appliqué 23 has a substantially L-shaped cross section having the outer portion 52 connected at an angle to the downward portion 50. In the examples in which the appliqué 23 has a U-shaped or L-shaped cross section, the structural member 22 is disposed overtop the downward portion 50 of the appliqué 23. Thus, the downward portion 50 engages with both the exterior or roof surface 20 of the motor vehicle 12 and with an underside 56 of the structural member 22, or with the bottom edge 29 of the outer surface 28. Moreover, both the structural member 22 and the appliqué 23 may be equipped with a plurality of connections or attachment points 58 connecting the structural member 22 to the appliqué 23 and/or to the roof surface 20 of the vehicle 12. In several aspects, the connections or attachment points 58 may include clips, bolts, studs, nuts, screws, interference fittings, tongue-and-groove joints, glue, welds, or rivets, or the like. It should be understood that while in the preceding discussion, the appliqué 23 has been described as having a U-shaped or L-shaped cross section, the cross sectional shape of the appliqué 23 may vary. For example, the appliqué 23 may have a cross section that is substantially A, R, L, U, X, or Π-shaped, or the like without departing from the scope or intent of the present disclosure.

An example of a U-shaped appliqué 23 is depicted in FIG. 6. In several aspects, according to the application in which the rail system 10 is to be used, the rail system 10 may be separated from the vehicle 12 by a mounting plate 60. The mounting plate 60 isolates the passenger compartment of the vehicle 12 from vibrations caused by air flow over the rail system 10, as well as vibrations and noise caused by loads attached to the rail system 10 and the like. The mounting plate 60 may be formed of a variety of different materials depending on the application. In some examples, the mounting plate 60 is composed of a flexible material such as rubber, polymer, urethane, polystyrene, or the like. In other examples, the mounting plate 60 primarily functions as an attachment between the rail system 10 and the vehicle 12. In another aspect, the mounting plate 60 forms a barrier between the rail system 10 and the vehicle 12 that may reduce the potential for water accumulation and infiltration into the vehicle 12, as well as improving resistance to galvanic corrosion when the rail system 10 includes metallic components in contact with the vehicle 12.

The appliqué 23 is disposed overtop the mounting plate 60 and the structural member 22 is disposed overtop the appliqué 23. As previously described, the structural member 22 is attached to the appliqué 23 by the plurality of connections or attachment points 58. Similarly, the appliqué 23 is attached to the mounting plate 60 by the plurality of connections or attachment points 58. In some aspects, the plurality of connections or attachment points 58 engage with both the structural member 22 and the appliqué 23. That is, in some examples, each or some of the plurality of connections or attachment points 58 engages with and connects with both of the structural member 22 and the appliqué 23. In a more specific example, a single connection or attachment point 58 such as a bolt may connect with and extend from the mounting plate 60 through the appliqué 23 to the structural member 22, thereby binding the mounting plate 60 to the appliqué 23 and the structural member 22. Moreover, the plurality of connections or attachment points 58 may engage with and connect the mounting plate 60 to the vehicle 12.

In this example of a roof rail 18, the mounting plate 60 is disposed below the appliqué 23 and the structural member 22, and above the vehicle 12. The mounting plate 60 extends for substantially the entire length of the rail system 10. A lower surface 62 of the mounting plate 60 is disposed in contact with the roof surface 20 of the vehicle 12, and an upper surface of the mounting plate 64 is disposed in contact with the second mating surface 44 of the appliqué 23.

The rail system 10 of the present disclosure offers several advantages. These include ease of use for operators of the vehicle 12, uncomplicated assembly procedures, and improved aesthetic design. Additionally, the rail system 10 of the present disclosure offers reduced wind noise and vibration characteristics.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A rail system for a motor vehicle, the rail system comprising:
    a structural member disposed on an exterior surface of the motor vehicle, wherein the structural member has an inner surface connected to an upper surface, the upper surface connected to an outer surface, and the inner surface spaced apart from the outer surface; and
    an appliqué attached to the structural member, the appliqué covering a bottom edge of the structural member and extending along a lower portion of the outer surface of the structural member wherein the appliqué obscures a portion of the outer surface of the structural member, wherein the appliqué extends from a first end to a second end with a middle section therebetween, and the first end is disposed behind a forward end of the structural member of the rail system, and wherein the second end is disposed in front of a rearward end of the structural member of the rail system.

2. The rail system of claim 1 wherein the inner surface is substantially parallel to the outer surface.

3. The rail system of claim 1 wherein the appliqué further comprises a first mating surface attached to the structural member at a plurality of attachment points, a second mating surface conforming to the exterior surface of the motor vehicle, and a decorative surface.

4. The rail system of claim 3 wherein the decorative surface forms a decorative outward-facing surface of the rail system, wherein the decorative outward-facing surface is substantially parallel to and facing away from a longitudinal axis of the motor vehicle.

5. The rail system of claim 3 wherein the decorative surface of the appliqué comprises a substantially planar curvilinear outer surface that substantially follows the outer surface of the structural member of the rail system.

6. A rail system for a motor vehicle, the rail system comprising:
   a structural member disposed on an exterior surface of the motor vehicle, wherein the structural member has an inner surface connected to an upper surface, the upper surface connected to an outer surface, and the inner surface spaced apart from the outer surface; and
   an appliqué attached to the structural member, the appliqué covering a bottom edge of the structural member and extending along a lower portion of the outer surface of the structural member wherein the appliqué obscures a portion of the outer surface of the structural member, wherein the appliqué further comprises a first mating surface attached to the structural member, a second mating surface conforming to the exterior surface of the motor vehicle, and a decorative surface, and wherein the outer surface of the structural member further comprises a first portion not obscured by the appliqué, and a second portion, the second portion defining a recess formed in the outer surface of the structural member, the recess sized to accept the appliqué and having a first depth, a first height, and a first length, the appliqué having a second depth between the first mating surface and the decorative surface, a second height, and a second length, wherein the first height is substantially equal to the second height, the first depth is substantially equal to the second depth and the first length is substantially equal to the second length, and wherein the decorative surface of the appliqué is substantially flush with the first portion of the outer surface of the structural member when the appliqué is disposed within the recess.

7. The rail system of claim 6 wherein the inner surface is substantially parallel to the outer surface.

8. The rail system of claim 6 wherein the decorative surface forms a decorative outward-facing surface of the rail system, wherein the decorative outward-facing surface is substantially parallel to and facing away from a longitudinal axis of the motor vehicle.

9. The rail system of claim 6 wherein the decorative surface of the appliqué comprises a substantially planar curvilinear outer surface that substantially follows the outer surface of the structural member of the rail system.

10. The rail system of claim 1 wherein the structural member comprises a first material and the appliqué comprises a second material different than the first material.

* * * * *